(12) United States Patent　　　(10) Patent No.:　US 12,610,332 B2

Sabol　　　　　　　　　　　　　　　　(45) Date of Patent:　　Apr. 21, 2026

(54) OPTIMIZING CELL SEARCHING IN 5G NEW RADIO WIRELESS NETWORKS OR OTHER WIRELESS NETWORKS

(71) Applicant: Raytheon Applied Signal Technology, Inc., San Jose, CA (US)

(72) Inventor: Eric Sabol, Cupertino, CA (US)

(73) Assignee: Raytheon Applied Signal Technology, Inc., San Jose, CA (US)

( * ) Notice: Subject to any disclaimer, the term of this patent is extended or adjusted under 35 U.S.C. 154(b) by 410 days.

(21) Appl. No.: 18/312,210

(22) Filed: May 4, 2023

(65) Prior Publication Data

US 2024/0373381 A1　　Nov. 7, 2024

(51) Int. Cl.
*H04W 56/00*　　　　　(2009.01)

(52) U.S. Cl.
CPC ............................... *H04W 56/0015* (2013.01)

(58) Field of Classification Search
CPC ................................................ H04W 56/0015
USPC ........................................................ 370/329
See application file for complete search history.

(56) References Cited

U.S. PATENT DOCUMENTS

| | | | |
|---|---|---|---|
| 11,272,433 B2 | 3/2022 | Karimli et al. | |
| 11,751,154 B2 * | 9/2023 | Jung | H04W 56/0015 |
| | | | 370/350 |
| 2021/0014815 A1 * | 1/2021 | Akkarakaran | H04W 56/0015 |
| 2021/0022019 A1 | 1/2021 | Zha et al. | |
| 2021/0050986 A1 * | 2/2021 | Manolakos | H04L 5/0005 |
| 2022/0150807 A1 | 5/2022 | Nishant et al. | |
| 2024/0147544 A1 * | 5/2024 | Li | H04L 5/0053 |
| 2025/0071700 A1 * | 2/2025 | Cui | H04W 56/0055 |

OTHER PUBLICATIONS

Nishant et al., "Efficient Protocol to Optimize New Radio Frequency Scanning in 5G Network," 2021 IEEE 4th 5G World Forum (5GWF), 2021, 6 pages.

* cited by examiner

*Primary Examiner* — Robert J Lopata

(57)　　　　　　ABSTRACT

An apparatus includes a transceiver configured to receive a broadcast signal. The apparatus also includes at least one processor configured to search for a synchronization signal within the broadcast signal. To search for the synchronization signal, the at least one processor is configured to (i) during a first stage, establish a reduced search space and identify one or more locations for the synchronization signal in the reduced search space and (ii) during a second stage, search for the synchronization signal in the one or more identified locations.

20 Claims, 6 Drawing Sheets

300

400

420

422

SPECTROGRAM WITH
INCORRECT FREQ RESOLUTION

422

SPECTROGRAM WITH
CORRECT FREQ RESOLUTION

SSB

424

440

502 — DATA

504 — EXTRACT DATA SEGMENT FROM DEVICE MEMORY

506 — CORRELATE WITH REFERENCE SSB SEQUENCES

508 — COMPUTE CORRELATION STRENGTH

510 — COMPARE TO FIXED THRESHOLD

512 — VALIDATED (OR NOT) SSB CANDIDATE

600

602 ESTABLISH REDUCED SEARCH SPACE

604 ACQUIRE DATA

606 COMPUTE SPECTROGRAM

608 ANALYZE SPECTROGRAM

610 VALIDATE CANDIDATES

OPTIMIZING CELL SEARCHING IN 5G NEW RADIO WIRELESS NETWORKS OR OTHER WIRELESS NETWORKS

TECHNICAL FIELD

This disclosure is generally directed to wireless communication systems. More specifically, this disclosure is directed to optimizing cell searching in 5G new radio wireless networks or other wireless networks.

BACKGROUND

The $3^{rd}$ Generation Partnership Project (3GPP) developed the fifth generation (5G) new radio (NR) network specification to replace fourth generation (4G) long term evolution (LTE) networks. A 5G NR network is based on orthogonal frequency division multiplexing (OFDM), utilizes two broad frequency ranges, and requires quick radio frame synchronization for efficient connection of a user terminal to a cell.

SUMMARY

This disclosure is directed to optimizing cell searching in 5G new radio wireless networks or other wireless networks.

In a first embodiment, an apparatus includes a transceiver configured to receive a broadcast signal. The apparatus also includes at least one processor configured to search for a synchronization signal within the broadcast signal. To search for the synchronization signal, the at least one processor is configured to (i) during a first stage, establish a reduced search space and identify one or more locations for the synchronization signal in the reduced search space and (ii) during a second stage, search for the synchronization signal in the one or more identified locations.

In a second embodiment, a method includes receiving a broadcast signal. The method also includes searching for a synchronization signal within the broadcast signal. Searching for the synchronization signal includes (i) during a first stage, establishing a reduced search space and identifying one or more locations for the synchronization signal in the reduced search space and (ii) during a second stage, searching for the synchronization signal in the one or more identified locations.

In a third embodiment, a non-transitory machine readable medium contains instructions that when executed cause at least one processor to search for a synchronization signal within a broadcast signal. The instructions that when executed cause the at least one processor to search for the synchronization signal include (i) instructions that when executed cause the at least one processor, during a first stage, to establish a reduced search space and identify one or more locations for the synchronization signal in the reduced search space and (ii) instructions that when executed cause the at least one processor, during a second stage, to search for the synchronization signal in the one or more identified locations.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, the $3^{rd}$ Generation Partnership Project (3GPP) developed the fifth generation (5G) new radio (NR) network specification to replace fourth generation (4G) long term evolution (LTE) networks. A 5G NR network is based on orthogonal frequency division multiplexing (OFDM), utilizes two broad frequency ranges, and requires quick radio frame synchronization for efficient connection of a user terminal to a cell. Reducing a scanning time for synchronization is an open area of research in wireless communications.

This disclosure provides techniques for efficient synchronization by optimizing cell searching in 5G new radio wireless networks or other wireless networks. As described in more detail below, in some embodiments, a base station transmits a synchronization signal that can be detected by one or more user terminals within a two-dimensional (2D) search space. In various embodiments, each user terminal performs a two-stage synchronization process. In the first stage, each user terminal can establish a reduced search space and identify one or more locations for the synchronization signal in the reduced search space. In the second stage, each user terminal can search for the synchronization signal in the one or more identified locations. As a result, each user terminal can efficiently identify the synchronization signal within a synchronization signal block (SSB) or other synchronization signal.

Figure 1:
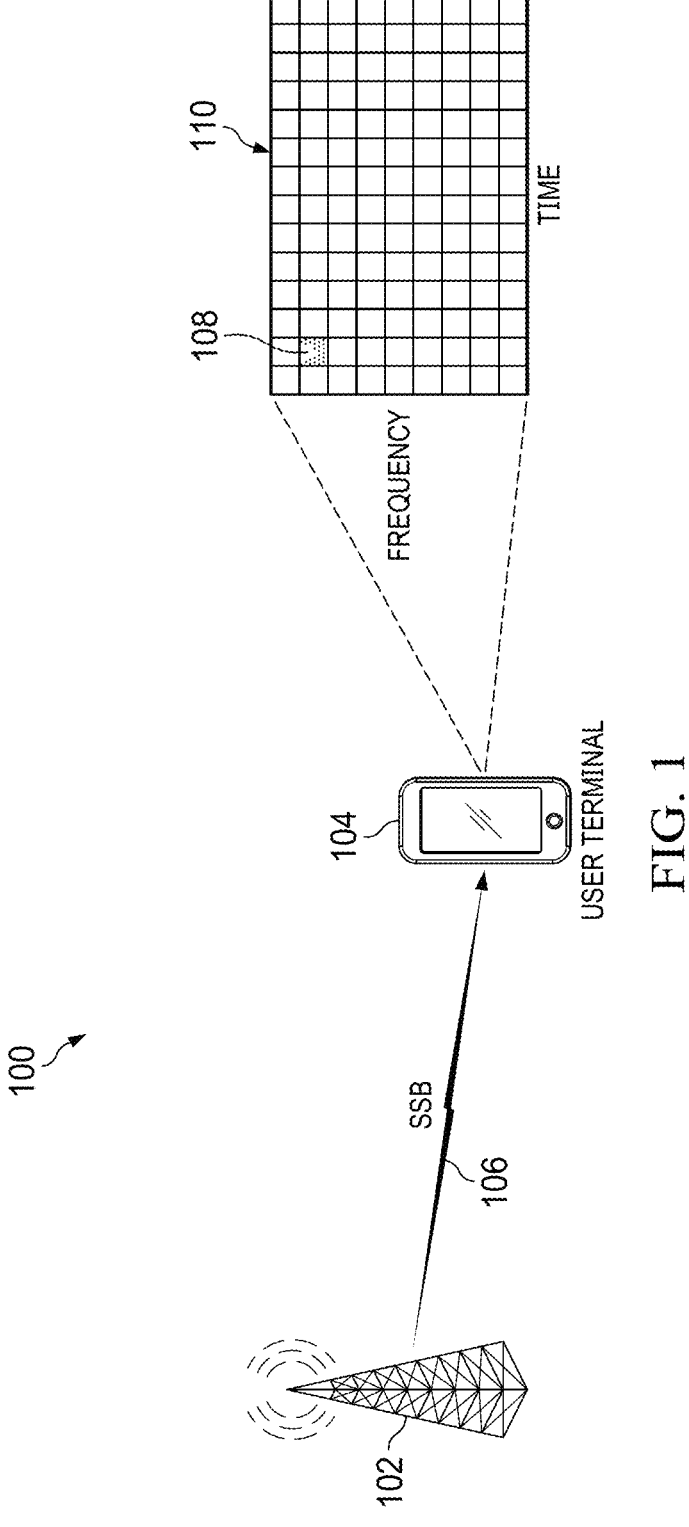
FIG. 1 illustrates an example wireless communication system according to this disclosure.

FIG. 1 illustrates an example wireless communication system 100 according to this disclosure. As shown in FIG. 1, the system 100 includes at least one base station 102 that communicates with at least one user terminal 104. Each base station 102 can represent any suitable component (or collection of components) configured to provide wireless access to a network, such as a transmit point (TP), transmit-receive point (TRP), 5G base station, or next generation node B (gNB). Each base station 102 may provide wireless access in accordance with one or more wireless communication protocols, such as the 5G 3GPP new radio (NR) network specification. For the sake of convenience, the term "base station" is used in this patent document to refer to a network infrastructure component that provides wireless access to one or more user terminals 104.

Each user terminal 104 represents any suitable device configured to access a network via one or more base stations 102. Each user terminal 104 may have any suitable form, such as a telephone, smartphone, tablet computer, laptop computer, desktop computer, Internet of Things (IoT) device, or other device. User terminals are often referred to by various other names, such as "user equipment," "mobile station," "subscriber station," "remote terminal," "wireless terminal," "receive point," or "mobile terminal." For the sake of convenience, the term "user terminal" is used in this patent document to refer to wireless equipment that interacts with at least one base station 102, whether the user terminal is a mobile device (such as a mobile telephone or smartphone) or is normally considered a stationary device (such as a desktop computer or vending machine). Also, the terms "cell search" and "synchronization" are used in this patent document to refer to the process of a user terminal 104 acquiring time and frequency synchronization with a cell associated with at least one base station 102 and optionally detecting a cell identifier, such as a physical layer Cell ID.

The base station 102 in this example includes at least one transceiver (or at least one transmitter and at least one separate receiver), which generally operates to transmit signals, including synchronization signals 106, used for communication or other purposes. In some cases, the synchronization signals 106 may be transmitted as a synchronization signal block (SSB). Synchronization signals, such as SSBs, may be transmitted at different times, using different frequencies, and can thus be thought of as occupying a specific location 108 within a 2D search space 110 that spans all possible transmission times and frequencies of the synchronization signals 106. For example, the 2D search space 110 may include different raster frequencies, which are a set of all pre-agreed frequencies that can be used to transmit the synchronization signals 106.

Synchronization signal blocks are often broadcast periodically, such as every 20 milliseconds, to allow devices, such as each user terminal 104, to synchronize to the base station 102. A synchronization signal block can be sent on any one of a known set of frequencies. Each user terminal 104 performs a cell search by searching for the synchronization signal block, which is performed in order for the user terminal 104 to communicate with a network through a base station 102. The synchronization signal block contains known data sequences, but the transmission times and frequencies of the sequences are not known by the user terminals 104. In prior approaches, a user terminal may be required to perform an exhaustive 2D search for the synchronization signal block over time and frequency. For example, the user terminal 104 may search each frequency raster by searching at a first frequency at each time point within the 2D search space 110. If the synchronization signal block 108 is not found, the user terminal 104 then searches at a second frequency at each time point within the 2D search space 110. This process is iteratively repeated for each frequency in the frequency raster until the synchronization signal block 108 is located. This is slow and cumbersome, and the processing involved can require more operating power (which can drain the power supply of the user terminal 104 more rapidly, resulting in a poor user experience).

In accordance with this disclosure, the user terminal 104 can search for synchronization signals 106 using a two-stage synchronization process. In the first stage, the user terminal 104 can establish a reduced search space and identify one or more locations for the synchronization signals 106 in the reduced search space. In the second stage, the user terminal 104 can search for the synchronization signals 106 in the one or more identified locations. As a result, the user terminal 104 can efficiently identify the synchronization signals 106 within 2D search space 110 much more rapidly and effectively.

Although FIG. 1 illustrates one example of a wireless communication system 100, various changes may be made to FIG. 1. For example, while only one base station 102 and one user terminal 104 are shown here, the system 100 may include any suitable number of base stations 102 and user terminals 104 that engage in any suitable unidirectional, bidirectional, or other communications or other interactions with each other. Also, the system 100 is shown in simplified form here and may include any number of additional components in any suitable configuration as needed or desired.

Figure 2:
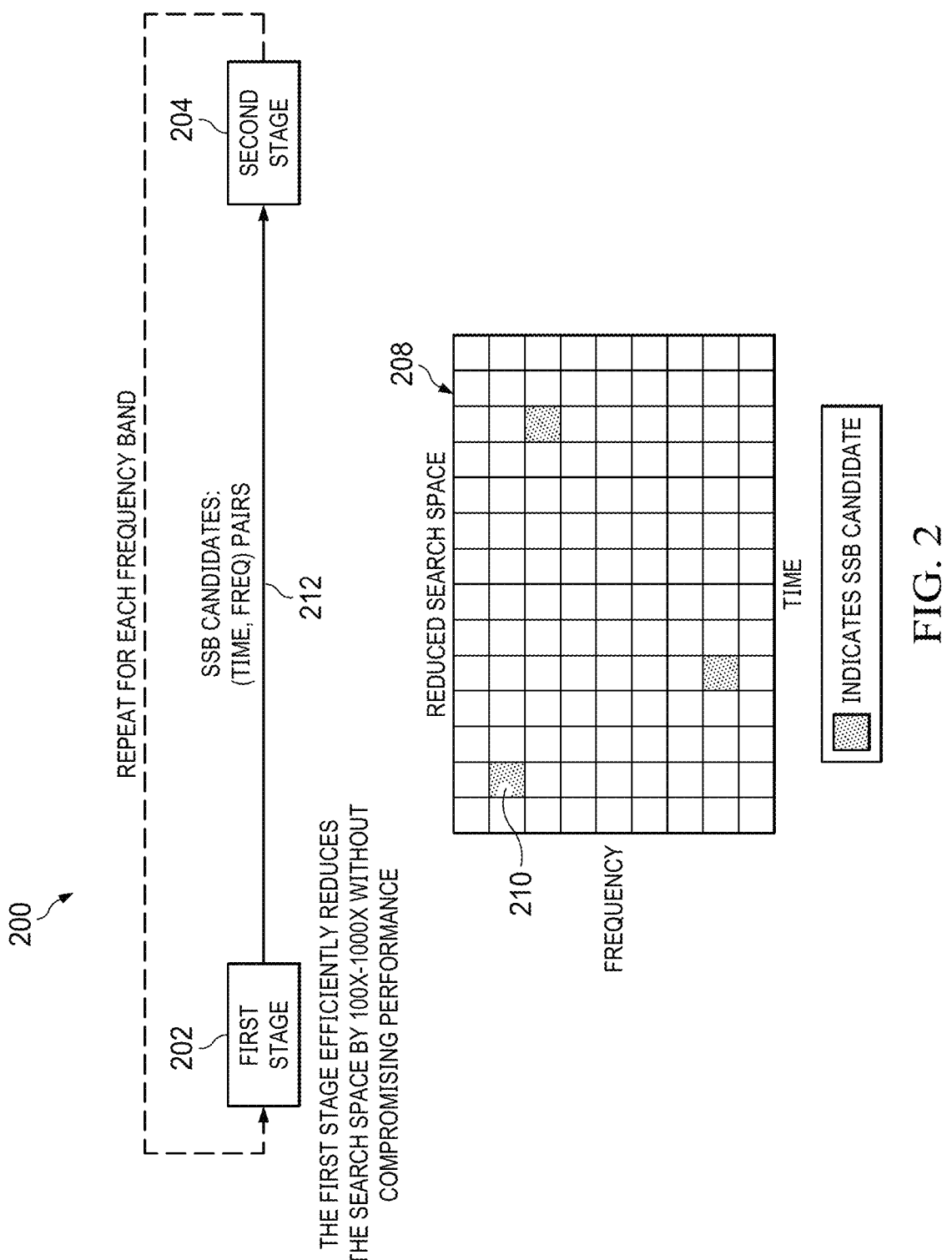
FIG. 2 illustrates an example synchronization process according to this disclosure.

FIG. 2 illustrates an example synchronization process 200 according to this disclosure. The synchronization process 200 may, for example, be used with or by the user terminal 104 of the system 100 of FIG. 1, such as when the user terminal 104 performs a cell search for synchronization with the base station 102. The synchronization process 200 efficiently enables the user terminal 104 to synchronize with the base station 102. However, the synchronization process 200 may be used by any other suitable device(s) and in any other suitable system(s).

As shown in FIG. 2, the synchronization process 200 includes a first stage 202 and a second stage 204. The first stage 202 efficiently reduces the 2D search space 110 when the user terminal 104 is searching for synchronization signal blocks 108. Based on the output of the first stage 202, the second stage 204 is used to search for the SSBs 108 within a reduced search space 208.

In reducing the 2D search space 110, the first stage 202 considers all raster frequencies within a given frequency band. A set of frequencies can be acquired at a same time and each frequency is considered/searched. The first stage 202 efficiently reduces the search space, such as by a factor of one hundred to one thousand, without compromising performance.

The reduced search space 208 consists of a set of one or more candidate synchronization signal block locations 210. Each candidate SSB location 210 is represented as a time-frequency pair 212 indicating the candidate's location in both time and frequency within the reduced search space 208. The second stage 204 validates each of the candidate SSB locations 210 to determine whether there is an SSB at the time and frequency corresponding to the candidate's time-frequency pair 212.

The user terminal 104 can repeat the two-stage synchronization signal block search for each frequency band. For example, after searching a first frequency band based on a first center frequency, the user terminal 104 can search a second frequency band based on a second center frequency, a third frequency band based on a third center frequency, and so forth. This can continue until all frequency bands have been searched. In some embodiments, different frequency bands may overlap or share one or more frequencies. In other embodiments, different frequency bands do not overlap and do not share one or more frequencies.

Although FIG. 2 illustrates one example of a synchronization process 200, various changes may be made to FIG. 2. For example, the synchronization process 200 may include any suitable number of stages, frequencies, carriers, subcarriers, or resource elements. Also, the process 200 may identify any suitable number of synchronization signal block candidates 210 depending on the specific circumstances.

Figure 3:
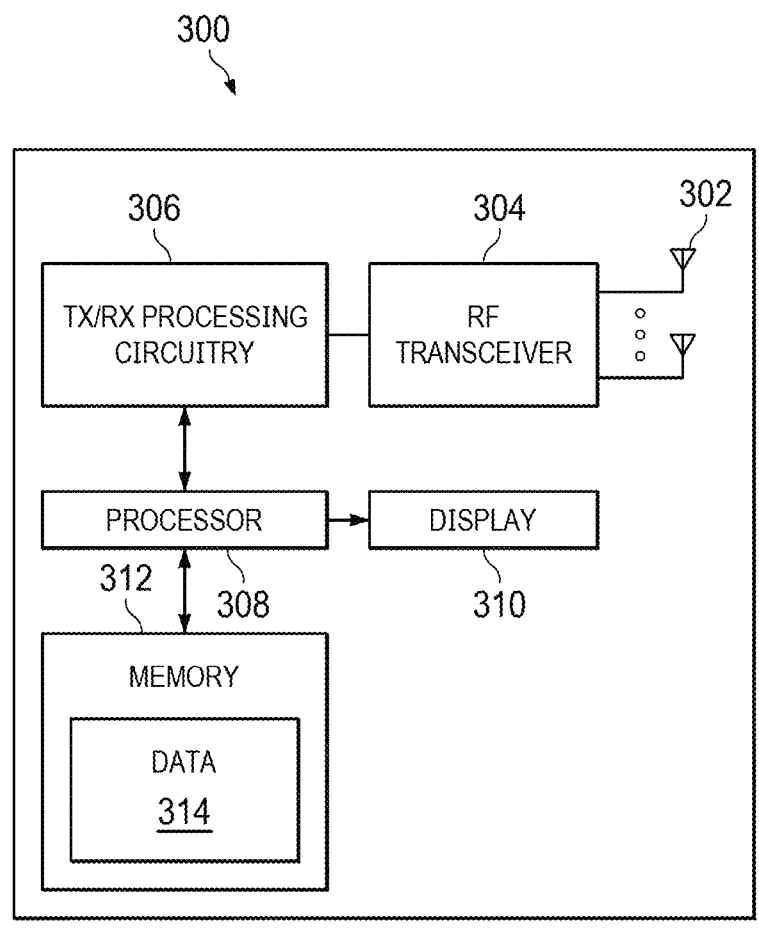
FIG. 3 illustrates an example user terminal according to this disclosure.

FIG. 3 illustrates an example user terminal 300 according to this disclosure. For example, the user terminal 300 of FIG. 3 may be used as the user terminal 104 in the system 100 of FIG. 1. However, user terminals come in a wide variety of configurations, and FIG. 3 does not limit the scope of this disclosure to any particular implementation of a user terminal.

As shown in FIG. 3, the user terminal 300 includes one or more antennas 302, a radio frequency (RF) transceiver 304, and transmit/receive (TX/RX) processing circuitry 306. The user terminal 300 also includes a processor 308, a display 310, and a memory 312. The memory 312 includes storage areas for data 314. In some embodiments, the memory 312 includes an operating system (OS) and one or more applications.

The RF transceiver 304 receives incoming RF signals from the antenna(s) 302. For example, the RF transceiver 304 may receive one or more synchronization signals 106 transmitted by the base station 102. The RF transceiver 304 down-converts the incoming RF signals to generate intermediate frequency (IF) or baseband signals for processing by the TX/RX processing circuitry 306, which generates processed baseband signals. The TX/RX processing circuitry 306 also receives outgoing baseband data from the processor 308. The TX/RX processing circuitry 306 encodes, multiplexes, and/or digitizes the outgoing baseband data to generate processed baseband or IF signals to be processed by the RF transceiver 304 and transmitted via the antenna(s) 302.

The processor 308 can include one or more processors or other processing devices and can generally operate to control the overall operation of the user terminal 300. In some embodiments, for example, the processor 308 includes at least one microprocessor or microcontroller. The processor 308 can move data into or out of the memory 312. The processor 308 is also coupled to the display 310. In some embodiments, the display 310 is a touchscreen. The operator of the user terminal 300 can use the touchscreen to enter data into the user terminal 300. The display 310 may be a liquid crystal display, light emitting diode display, or other display capable of rendering text and/or at least limited graphics, such as from web sites. The memory 312 is coupled to the processor 308. In some cases, part of the memory 312 could include a random access memory (RAM), and another part of the memory 312 could include a Flash memory or other read-only memory (ROM).

The processor 308 can be responsible for performing the two-stage synchronization process described in this disclosure. For example, the processor 308 may analyze data representing the RF signals (as provided from the TX/RX processing circuitry 306) in order to establish a reduced search space and identify one or more locations for the synchronization signals 106 in the reduced search space. The processor 308 may also search for the synchronization signals 106 in the one or more identified locations.

Although FIG. 3 illustrates one example of a user terminal 300, various changes may be made to FIG. 3. For example, various components in FIG. 3 could be combined, further subdivided, replicated, rearranged, or omitted and additional components could be added according to particular needs. As a particular example, the processor 308 could be divided into multiple processors, such as one or more central processing units (CPUs) and one or more graphics processing units (GPUs). Also, while FIG. 3 illustrates a user terminal 300 that is configured as a mobile telephone or smartphone, user terminals could be configured to operate as other types of mobile or stationary devices.

Figure 4A:
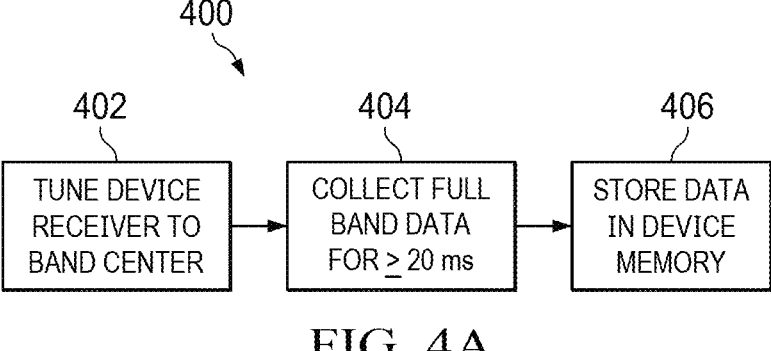
FIGS. 4A through 4C illustrate an example first stage of a synchronization process according to this disclosure.
Figure 4B:
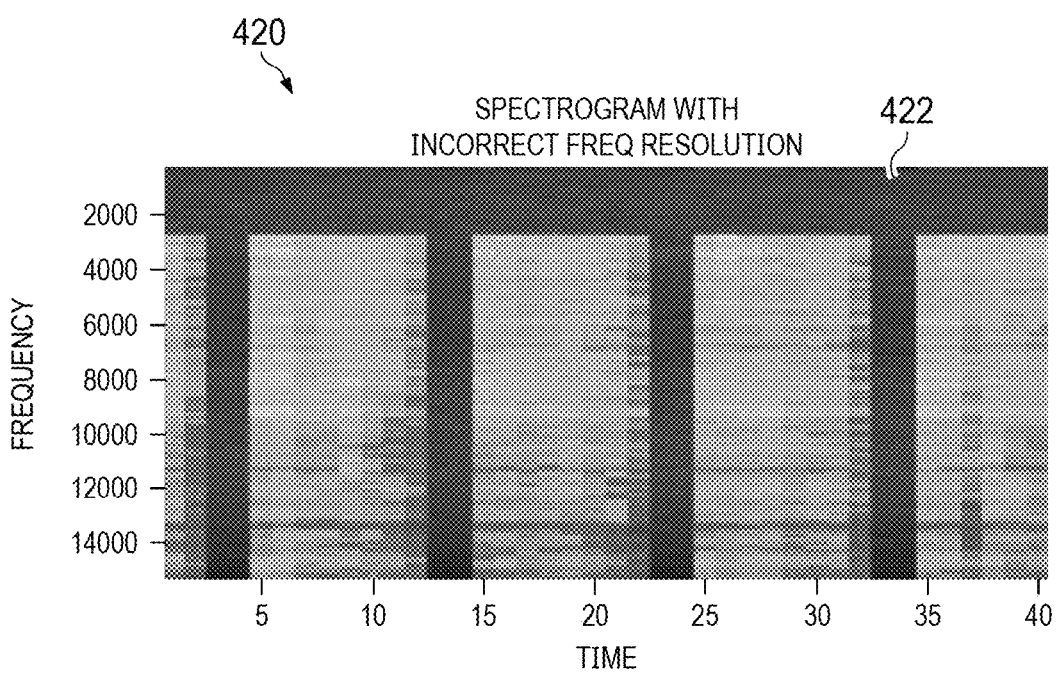
Figure 4B:
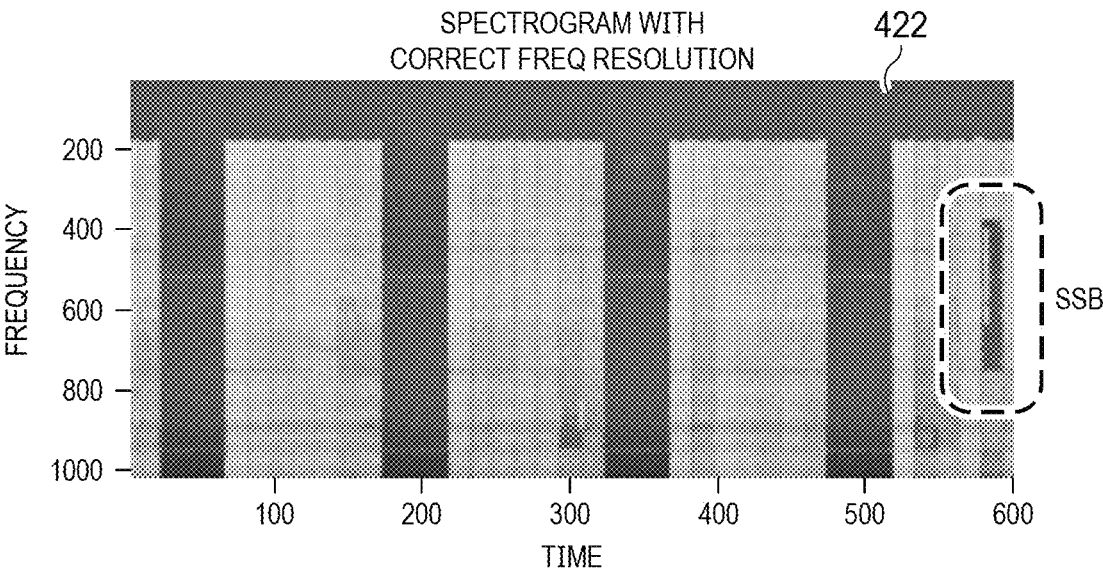
Figure 4C:
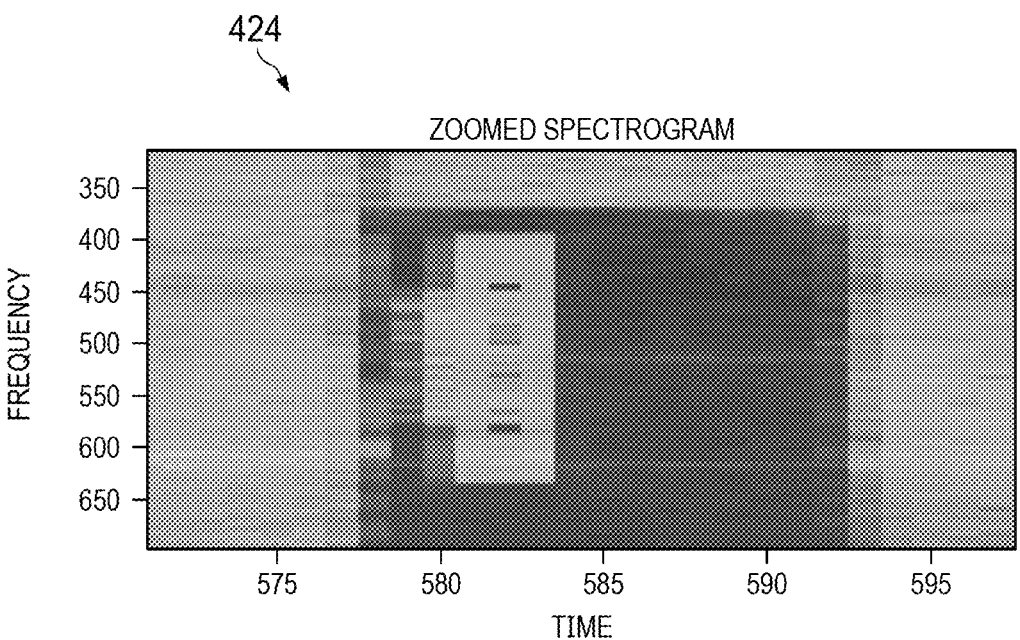
Figure 4C:
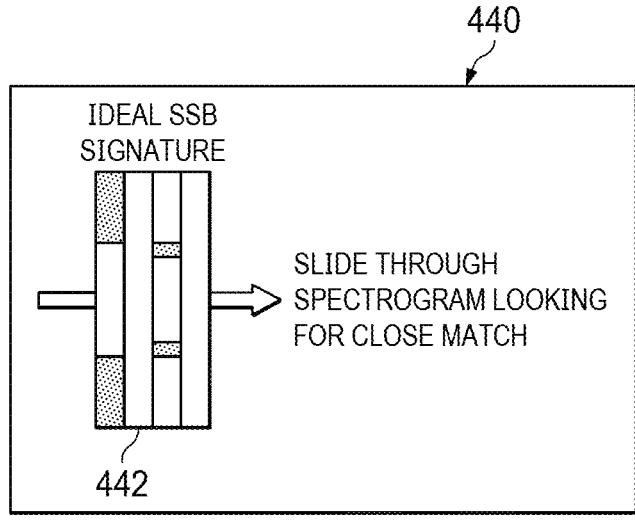

FIGS. 4A through 4C illustrate an example first stage 202 of the synchronization process 200 according to this disclosure. The first stage 202 may, for example, be used with or included in the synchronization process 200 used by the user terminal 104 in the system 100 of FIG. 1, such as when the user terminal 104 performs a cell search for communication with and through the base station 102. However, the first stage 202 may be used by any other suitable device(s) and in any other suitable system(s).

The first stage 202 reduces the search space by quickly locating synchronization signal block candidates 210. In some embodiments, the first stage 202 includes three overall types of operations, namely (i) data acquisition operations 400, (ii) spectrogram generation operations 420, and (iii) spectrogram searching operations 440. Example data acquisition operations 400 are shown in FIG. 4A, example spectrogram generation operations 420 are shown in FIG. 4B, and example spectrogram searching operations 440 are shown in FIG. 4C.

As shown in FIG. 4A, the data acquisition operations 400 allow the user terminal 104 to acquire data associated with incoming wireless signals. For example, in operation 402, the user terminal 104 tunes a receiver to a band center, meaning the center frequency of a frequency band to be searched. A synchronization signal block can be transmitted periodically, such as every 20 milliseconds. Thus, in operation 404, the user terminal 104 collects data for at least 20 milliseconds in order to ensure capturing at least one instance of the synchronization signal block. For example, after the user terminal 104 tunes its receiver to the center of the frequency band being searched, the user terminal 104 collects at least 20 milliseconds of data using a bandwidth spanning the entire frequency band. Note that while 20 milliseconds is used here as an example, other time periods may be used. In operation 406, the collected data is stored in a memory of the user terminal 104.

As shown in FIG. 4B, the spectrogram generation operations 420 involve the user terminal 104 generating a spectrogram 422. The spectrogram 422 displays frequency content of the incoming signals as the frequency content changes over time. In some embodiments, the spectrogram 422 is generated by performing a Fast Fourier Transform (FFT) for each frequency over time. In generating the spectrogram 422, there is a choice of frequency resolution. In some cases, the frequency resolution used by the user terminal 104 may be determined as follows.

$$frequency\ resolution = \frac{Sampling\ Rate}{FFT\ size} \quad (1)$$

Here, the user terminal 104 adjusts a sampling rate or FFT size to set the frequency resolution to match a subcarrier spacing. The subcarrier spacing is typically known ahead of time for each frequency band. When the frequency resolution is chosen to exactly match the subcarrier spacing used in the construction of a synchronization signal block, a synchronization signal block signature 424 becomes readily apparent from the spectrogram. Therefore, the user terminal 104 can be configured to tune the sampling rate and/or FFT size based on the subcarrier spacing. In certain examples, the subcarrier spacing (SCS) is uniquely determined by the frequency band. In some cases, there may be more than one possible SCS for a given band. Embodiments of the present disclosure can accommodate such cases by iterating through each possible SCS, i.e., for that band, the two-stage search is repeated once for the first SCS, again for the second SCS, and so-forth.

As shown in FIG. 4C, the spectrogram searching operations 440 involve the user terminal 104 searching the spectrogram 422 to identify the characteristic shape of the synchronization signal block signature 424. That is, the user terminal 104 searches for energy received across spectrogram bins that identifies the presence of one or more synchronization signal signatures in the spectrogram 422. In some cases, the spectrogram search may more closely resemble an image processing operation rather than a signal processing operation. As a result, one or more image processing techniques may be used here. For example, a kernel function can be used in which a small matrix is moved through the data to determine a match. At each authorized synchronization signal block location, the user terminal 104 may generate a score to quantify a degree of similarity between the synchronization signal block signature 424 and an ideal synchronization signal block signature 442. If the score exceeds a threshold, the user terminal 104 can mark the location as a candidate and pass information (such as time and frequency coordinates) to the second stage 204. Note that while the spectrogram search is still two-dimensional, a spectrogram comparison-based synchronization can be much more efficient than a conventional 2D search.

Although FIGS. 4A through 4C illustrate one example of a first stage 202 of the synchronization process 200, various changes may be made to FIGS. 4A through 4C. For example, various operations shown in FIGS. 4A through 4C could overlap, occur in parallel, occur in a different order, or occur multiple times.

Figure 5:
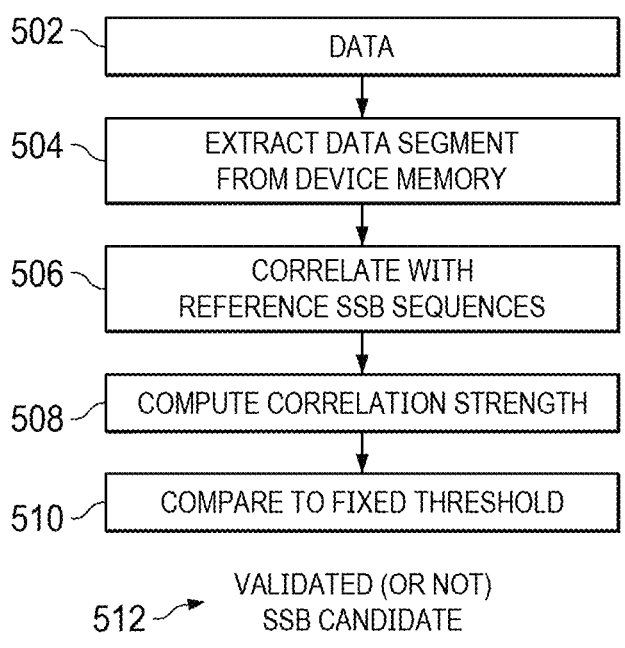
FIG. 5 illustrates an example second stage of a synchronization process according to this disclosure.

FIG. 5 illustrates an example second stage 204 of the synchronization process 200 according to this disclosure. The second stage 204 may, for example, be used with or included in the synchronization process 200 used by the user terminal 104 in the system 100 of FIG. 1, such as when the user terminal 104 performs a cell search for communication with and through the base station 102. However, the second stage 204 may be used by any other suitable device(s) and in any other suitable system(s).

The second stage 204 validates each candidate identified by the first stage 202, such as by correlation with reference synchronization signal block sequences (which are known ahead of time). The data 502 includes the synchronization signal block signature 424 output from the first stage 202. For example, in operation 504, the user terminal 104 may extract or otherwise obtain the data 502, such as from the memory 312. That is, a specific candidate from the first stage, indicated as a (time,freq) pair, can be used to configure a data extraction in operation 504. In other words, the (time,freq) values are used to index into the data 502 stored in device memory. In operation 506, the user terminal 104 correlates the data 502 with the reference synchronization signal block sequences. In some cases, the specific correlation performed here may be similar to that used by other systems. However, the correlation only needs to be performed on selected candidate locations within the 2D search space of the reduced search space 208. In operation 508, the user terminal 104 computes a correlation strength and compares the computed correlation strength to a threshold value in operation 510. Based on the correlation, the user terminal 104 determines whether any validated synchronization signal block candidates 512 are present. The validated synchronization signal block candidates 512 can represent locations where a synchronization signal block is present.

Although FIG. 5 illustrates one example of the second stage 204 of the synchronization process 200, various changes may be made to FIG. 5. For example, various operations shown in FIG. 5 could overlap, occur in parallel, occur in a different order, or occur multiple times.

Figure 6:
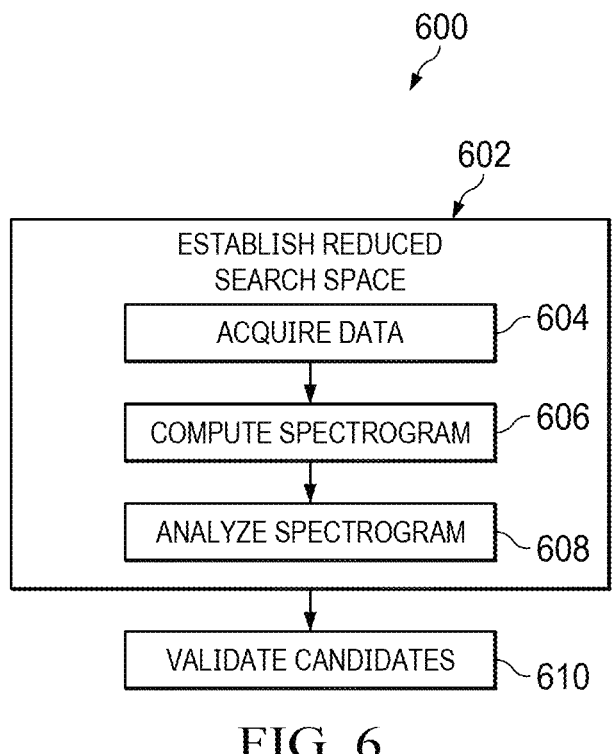
FIG. 6 illustrates an example method for optimizing cell searching in a wireless network according to this disclosure.

FIG. 6 illustrates an example method 600 for optimizing cell searching in a wireless network according to this disclosure. For ease of explanation, the method 600 is described with respect to the user terminal 104 in the system 100 of FIG. 1. However, the method 600 could be performed by any other suitable device(s) and in any other suitable system(s).

In operation 602, a user terminal 104 commences a cell search by establishing a reduced search space for searching for a synchronization signal. As part of this process, in operation 604, the user terminal 104 acquires data by tuning its receiver to a center frequency of a frequency band, collecting full-band data for each band for at least a specified time period (such as 20 milliseconds), and storing the data. The user terminal 104 generates a spectrogram based on the obtained data in operation 606. To generate the spectrogram, the user terminal 104 tunes the sampling rate and/or FFT size based on a subcarrier spacing such that a computed frequency resolution matches the subcarrier spacing. In operation 608, the user terminal 104 analyzes the spectrogram to determine if any portions of the spectrogram match an ideal synchronization signal block signature. This represents the first stage of the two-stage process described above.

The user terminal 104 validates one or more of the identified candidate synchronization signal blocks in operation 610. Accordingly, the user terminal 104 is able to identify the synchronization signal blocks for synchronization by searching bands of the synchronization signal block 108, instead of searching individual frequencies. This represents the second stage of the two-stage process described above.

Although FIG. 6 illustrates one example of a method 600 for optimizing cell searching in a wireless network, various changes may be made to FIG. 6. For example, while shown as a series of steps, various steps in FIG. 6 could overlap, occur in parallel, occur in a different order, or occur multiple times.

The following describes example embodiments of this disclosure that implement or relate to optimizing cell searching in 5G new radio wireless networks or other wireless networks. However, other embodiments may be used in accordance with the teachings of this disclosure.

In a first embodiment, an apparatus includes a transceiver configured to receive a broadcast signal. The apparatus also includes at least one processor configured to search for a synchronization signal within the broadcast signal. To search for the synchronization signal, the at least one processor is configured to (i) during a first stage, establish a reduced search space and identify one or more locations for the synchronization signal in the reduced search space and (ii) during a second stage, search for the synchronization signal in the one or more identified locations.

In a second embodiment, a method includes receiving a broadcast signal. The method also includes searching for a synchronization signal within the broadcast signal. Searching for the synchronization signal includes (i) during a first stage, establishing a reduced search space and identifying one or more locations for the synchronization signal in the reduced search space and (ii) during a second stage, searching for the synchronization signal in the one or more identified locations.

In a third embodiment, a non-transitory machine readable medium contains instructions that when executed cause at least one processor to search for a synchronization signal within a broadcast signal. The instructions that when executed cause the at least one processor to search for the synchronization signal include (i) instructions that when executed cause the at least one processor, during a first stage, to establish a reduced search space and identify one or more locations for the synchronization signal in the reduced search space and (ii) instructions that when executed cause the at least one processor, during a second stage, to search for the synchronization signal in the one or more identified locations.

Any single one or any suitable combination of the following features may be used with the first, second, or third embodiment. During the first stage, data may be acquired from the broadcast signal. A spectrogram may be generated, which may include tuning a sampling rate and/or FFT size based on a subcarrier spacing such that a determined frequency resolution matches the subcarrier spacing. One or more synchronization signal signatures may be identified within the spectrogram. The locations for the synchronization signal in the reduced search space may be identified based on the one or more identified synchronization signal signatures. During the second stage, each identified location for the synchronization signal in the reduced search space may be validated based on correlating the data with reference synchronization signal sequences.

In certain embodiments, the disclosed methods and techniques can be applied to non-RF communication systems including optical communications systems. For example, a non-terrestrial communication system may incorporate a satellite clock synch process in which a master satellite (SAT), spacecraft or a ground station may broadcast synch signals to other SATs, which may use the described techniques to quickly and efficiently achieve synchronization.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a transceiver configured to receive a broadcast signal; and
   at least one processor configured to search for a synchronization signal within the broadcast signal;
   wherein, to search for the synchronization signal, the at least one processor is configured to (i) during a first stage, establish a reduced search space and identify one or more locations for the synchronization signal in the reduced search space using a spectrographic generation operation to generate a spectrogram that displays frequency content of the received broadcast signal and using a spectrogram search operation to determine the one or more locations by comparing the generated spectrogram to an ideal synchronization signal block signature and (ii) during a second stage, search for the synchronization signal in the one or more identified locations.

2. The apparatus of claim 1, wherein, during the first stage, the at least one processor is configured to acquire data from the broadcast signal.

3. The apparatus of claim 1, wherein, to generate the spectrogram, the at least one processor is configured to tune a sampling rate, a Fast Fourier Transform (FFT) size, or both, based on a subcarrier spacing such that a determined frequency resolution matches the subcarrier spacing.

4. The apparatus of claim 2, wherein, during the second stage, the at least one processor is configured to validate each identified location for the synchronization signal in the reduced search space based on correlating the data with reference synchronization signals.

5. A method comprising:
   receiving a broadcast signal; and
   searching for a synchronization signal within the broadcast signal;

wherein searching for the synchronization signal comprises (i) during a first stage, establishing a reduced search space and identifying one or more locations for the synchronization signal in the reduced search space using a spectrographic generation operation to generate a spectrogram that displays frequency content of the received broadcast signal and using a spectrogram search operation to determine the one or more locations by comparing the generated spectrogram to an ideal synchronization signal block signature and (ii) during a second stage, searching for the synchronization signal in the one or more identified locations.

6. The method of claim 5, further comprising:
during the first stage, acquiring data from the broadcast signal.

7. The method of claim 5, wherein generating the spectrogram comprises tuning a sampling rate, a Fast Fourier Transform (FFT) size, or both, based on a subcarrier spacing such that a determined frequency resolution matches the subcarrier spacing.

8. The method of claim 6, further comprising:
during the second stage, validating each identified location for the synchronization signal in the reduced search space based on correlating the data with reference synchronization signals.

9. A non-transitory machine readable medium containing instructions that when executed cause at least one processor to:
search for a synchronization signal within a broadcast signal;
wherein the instructions that when executed cause the at least one processor to search for the synchronization signal comprise (i) instructions that when executed cause the at least one processor, during a first stage, to establish a reduced search space and identify one or more locations for the synchronization signal in the reduced search space using a spectrographic generation operation to generate a spectrogram that displays frequency content of the received broadcast signal and using a spectrogram search operation to determine the one or more locations by comparing the generated spectrogram to an ideal synchronization signal block signature and (ii) instructions that when executed cause the at least one processor, during a second stage, to search for the synchronization signal in the one or more identified locations.

10. The non-transitory machine readable medium of claim 9, further containing instructions that when executed cause the at least one processor, during the first stage, to acquire data from the broadcast signal.

11. The non-transitory machine readable medium of claim 10,
wherein the instructions that when executed cause the at least one processor to generate the spectrogram comprise:
instructions that when executed cause the at least one processor to tune a sampling rate, a Fast Fourier Transform (FFT) size, or both, based on a subcarrier spacing such that a determined frequency resolution matches the subcarrier spacing.

12. The non-transitory machine readable medium of claim 10, further containing instructions that when executed cause the at least one processor, during the second stage, to validate each identified location for the synchronization signal in the reduced search space based on correlating the data with reference synchronization signals.

13. The apparatus of claim 1, wherein, during the first stage, the at least one processor is configured to:
tune the transceiver to a center frequency of a frequency band to be searched within the broadcast signal; and
collect data for a predetermined period of time to capture the synchronization signal within the broadcast signal.

14. The apparatus of claim 1, wherein, during the first stage, the at least one processor is configured to:
compare the ideal synchronization signal block signature to the generated spectrogram at a plurality of locations within the spectrogram;
generate a score to quantify a degree of similarity between the ideal synchronization signal block signature at each of the plurality of locations within the spectrogram; and
determine the one or more locations for the synchronization signal based on the score exceeding a predetermined threshold.

15. The apparatus of claim 1, wherein the first stage identifies the one or more locations for the synchronization signal as a time/frequency pair.

16. The method of claim 5, wherein, during the first stage, the searching further comprises:
tuning a transceiver to a center frequency of a frequency band to be searched within the broadcast signal; and
collecting data for a predetermined period of time to capture the synchronization signal within the broadcast signal.

17. The method of claim 5, wherein, during the first stage, the, the searching further comprises:
comparing the ideal synchronization signal block signature to the generated spectrogram at a plurality of locations within the spectrogram;
generating a score to quantify a degree of similarity between the ideal synchronization signal block signature at each of the plurality of locations within the spectrogram; and
determining the one or more locations for the synchronization signal based on the score exceeding a predetermined threshold.

18. The method of claim 5, wherein, during the first stage, the, the searching further comprises identifying the one or more locations for the synchronization signal as a time/frequency pair.

19. The non-transitory machine readable medium of claim 9, further containing instructions that when executed cause the at least one processor, during the first stage, to:
tune a transceiver to a center frequency of a frequency band to be searched within the broadcast signal; and
collect data for a predetermined period of time to capture the synchronization signal within the broadcast signal.

20. The non-transitory machine readable medium of claim 9, further containing instructions that when executed cause the at least one processor, during the first stage, to:
compare the ideal synchronization signal block signature to the generated spectrogram at a plurality of locations within the spectrogram;
generate a score to quantify a degree of similarity between the ideal synchronization signal block signature at each of the plurality of locations within the spectrogram; and
determine the one or more locations for the synchronization signal based on the score exceeding a predetermined threshold.

* * * * *